(12) United States Patent
Hasebe et al.

(10) Patent No.: US 6,969,086 B2
(45) Date of Patent: Nov. 29, 2005

(54) AIRBAG AND AIRBAG DEVICE

(75) Inventors: Masahiro Hasebe, Hikone (JP); Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/671,801

(22) Filed: Sep. 29, 2003

(65) Prior Publication Data

US 2004/0145160 A1    Jul. 29, 2004

(30) Foreign Application Priority Data

Jan. 23, 2003  (JP) .............................. 2003-015108

(51) Int. Cl.⁷ .............................................. B60R 21/16
(52) U.S. Cl. .................................................. 280/743.1
(58) Field of Search .................... 280/743.1, 730.1, 280/728.2, 731, 732, 743.2

(56) References Cited

U.S. PATENT DOCUMENTS

| | | | |
|---|---|---|---|
| 3,792,873 A | 2/1974 | Buchner et al. | |
| 5,125,682 A * | 6/1992 | Hensler et al. | 280/730.1 |
| 5,213,361 A | 5/1993 | Satoh et al. | |
| 5,934,701 A | 8/1999 | Furukawa | |
| 6,505,851 B2 * | 1/2003 | Frisch | 280/728.3 |
| 6,536,801 B2 * | 3/2003 | Frisch | 280/743.1 |
| 6,540,254 B2 * | 4/2003 | Bieber et al. | 280/732 |
| 6,554,317 B2 * | 4/2003 | Lorenz et al. | 280/743.1 |
| 6,588,798 B2 * | 7/2003 | Bohn et al. | 280/743.1 |
| 6,595,549 B2 * | 7/2003 | Bohn et al. | 280/743.1 |
| 6,726,245 B2 * | 4/2004 | Fellhauer et al. | 280/743.2 |
| 6,802,534 B2 | 10/2004 | Neupert | |
| 2002/0084631 A1 * | 7/2002 | Lorenz et al. | 280/728.2 |
| 2002/0084638 A1 * | 7/2002 | Neupert | 280/743.1 |
| 2002/0084640 A1 * | 7/2002 | Bohn | 280/743.1 |
| 2002/0084641 A1 * | 7/2002 | Fellhauer et al. | 280/743.1 |
| 2002/0195809 A1 * | 12/2002 | Bieber et al. | 280/743.1 |
| 2003/0218325 A1 * | 11/2003 | Hasebe et al. | 280/743.2 |
| 2003/0230883 A1 * | 12/2003 | Heym | 280/743.1 |

FOREIGN PATENT DOCUMENTS

| | | | | |
|---|---|---|---|---|
| JP | 47-2361 | 2/1972 | | |
| JP | 47-21783 | 7/1972 | | |
| JP | 47-30044 | 11/1972 | | |
| JP | 47-30045 | 11/1972 | | |
| JP | 49023176 B | 6/1974 | | |
| JP | 3-32956 | 2/1991 | | |
| JP | 4-9349 | 1/1992 | | |
| JP | 4-55141 | 2/1992 | | |
| JP | 4-201644 | 7/1992 | | |
| JP | 4-292239 | 10/1992 | | |
| JP | 04292239 A | * 10/1992 | ........... | B60R 21/16 |
| JP | 5-178146 | 7/1993 | | |
| JP | 7-285408 | 10/1995 | | |

* cited by examiner

*Primary Examiner*—Faye M. Fleming
(74) *Attorney, Agent, or Firm*—Manabu Kanesaka

(57) ABSTRACT

An airbag device includes an airbag and an inflator disposed at a side of a base portion of the airbag for inflating the airbag. The airbag is inflated such that distal ends thereof extend away from the base side of the airbag. The airbag includes a left half airbag to be inflated at a front left of a vehicle occupant, and a right half airbag to be inflated at a front right of the vehicle occupant. The distal ends of the left half airbag and the right half airbag are spaced part from each other to form an empty space therebetween facing the vehicle occupant when the airbag is inflated.

8 Claims, 4 Drawing Sheets

AIRBAG AND AIRBAG DEVICE

BACKGROUND OF THE INVENTION AND RELATED ART STATEMENT

The present invention relates to an airbag for protecting a vehicle occupant in the event of vehicle collision, and specifically relates to an airbag having a left half airbag to be inflated at a front left of the occupant, and a right half airbag to be inflated at a front right of the occupant.

Japanese Patent Publication (KOKAI) No. 04-292239 has disclosed an airbag for protecting a vehicle occupant in the event of vehicle collision. The airbag has a left half airbag to be inflated at a front left of the occupant, and a right half airbag to be inflated at the front right of the occupant. A common inflator inflates both the left half and right half airbags. In the airbag, a distal end of the left half airbag is connected to a distal end of the right half airbag with a tie panel.

The airbag is folded in a case and covered with a cover. In the event of vehicle collision, an inflator, i.e. a gas generator, injects gas to inflate the airbag rapidly in front of the occupant by pushing and opening the cover.

The inflator is disposed at an inside or outside of a base portion of the airbag. In an airbag device having an inflator disposed at an outside of the base portion of the airbag, the gas from the inflator is supplied into the airbag through a gas inlet disposed at the base portion side of the airbag. In an airbag device having an inflator disposed at an inside of the base portion side of the airbag, the inflator is entirely or partially disposed in the airbag. An example of the latter case includes a configuration in which a pair of slit openings is formed in the airbag, and a rod inflator passes through the slit openings, so that both ends of the inflator expose at the outside of the airbag.

In the airbag disclosed in Japanese Patent Publication No. 04-292239, the distal ends of the left half and right half airbags are connected with the tie panel. Therefore, when the airbag is inflated, the tie panel receives a center part of the vehicle occupant's body in the lateral direction. When the left half and right half airbags are inflated, a larger amount of the gas may flow in one of the half airbags from the inflator, and then the other of the half airbags is inflated later than the one of the half airbags.

As described above, the distal ends of the left and right half airbags are connected with the tie panel. Accordingly, it is expected that when one of the half airbags is inflated faster than the other, the one of the half airbags may facilitate the other of the half airbags to be inflated by pulling the other of the half airbags through the tie panel. As described above, however, the tie panel connects the distal ends of the left and right half airbags. Therefore, the one of the half airbags does not sufficiently pull the other of the half airbags through the tie panel until the one of the half airbags is inflated up to the distal end.

In view of the problem described above, an object of the present invention is to provide an airbag wherein a left half airbag and a right half airbag are inflated smoothly and substantially uniformly toward left and right sides from an early stage of the inflation.

Further objects and advantages of the invention will be apparent from the following description of the invention.

SUMMARY OF THE INVENTION

According to the present invention, an airbag device includes an airbag and an inflator disposed at a side of a base portion of the airbag for inflating the airbag. The airbag is inflated such that a distal end thereof extends away from the base side of the airbag. The airbag also includes a left half airbag to be inflated at a front left of a vehicle occupant, and a right half airbag to be inflated at a front right of the vehicle occupant. The left half airbag has a distal end connected with a distal end of the right half airbag, and a space facing the vehicle occupant is formed between the distal ends of the left and right half airbags when the airbag is inflated.

In the airbag and the airbag device of the present invention, when the airbag is inflated, the left half airbag receives the left side of the occupant's thorax and the right half airbag receives the right side of the occupant's thorax. The left and right sides of the thorax have hard and strong rib bones. The airbag receives and absorbs an impact on the occupant through the rib bones. In the inflated state, the airbag has the space between the distal ends of the left and right half airbags, and the space faces a central portion of the occupant's thorax where a breastbone is situated. Accordingly, when the occupant's body plunges into the airbag, the portion around the breastbone does not receive a strong impact, thereby decreasing a load on the breastbone.

According to the present invention, a distance between the distal ends of the left half and right half airbags may be set to be 150 to 350 mm when the airbag is inflated. As a result, the left half airbag faces a center of the left side of the thorax and the inflated right half airbag faces a center of the right side of the thorax, thereby securely receiving the occupant's upper body around the rib bones.

According to the present invention, a common inflator may be provided for inflating both the left half airbag and the right half airbag, thereby reducing the number of the inflators and a manufacturing cost.

According to the present invention, the left half airbag may be connected with the right half airbag at middle areas of surfaces facing with each other in a direction that the airbag deploys. With such a configuration, when one of the half airbags inflates later, the other of the half airbags facilitates the one of the half airbags to be inflated by pulling the one of the half airbags. Also, the one of the half airbags starts to pull the other of the half airbags in the direction of deployment at an early stage when the one of the half bags is inflated up to the middle. Accordingly, both of the left and right half airbags are inflated smoothly and substantially uniformly toward left and right sides from the early stage of the inflation.

According to the present invention, each of the left and right half airbags may be formed of a plurality of joined panels. The panels are joined at joined portions at an outside and the middle of the airbag in the direction of deployment. The joined portions at the middle of the opposing surfaces of the left and right half airbags may be connected. In this case, a tie panel for connecting the left half airbag and the right half airbag is not necessary, thereby reducing a cost of the airbag.

BRIEF DESCRIPTION OF THE DRAWINGS

FIGS. 1(a) and 1(b) are views showing an airbag according to an embodiment of the present invention, wherein FIG. 1(a) is a perspective view of the airbag in an inflated state, and FIG. 1(b) is a sectional view taken along line 1(b)—1(b) in FIG. 1(a);

DETAILED DESCRIPTION OF PREFERRED EMBODIMENTS

Figure 1A:
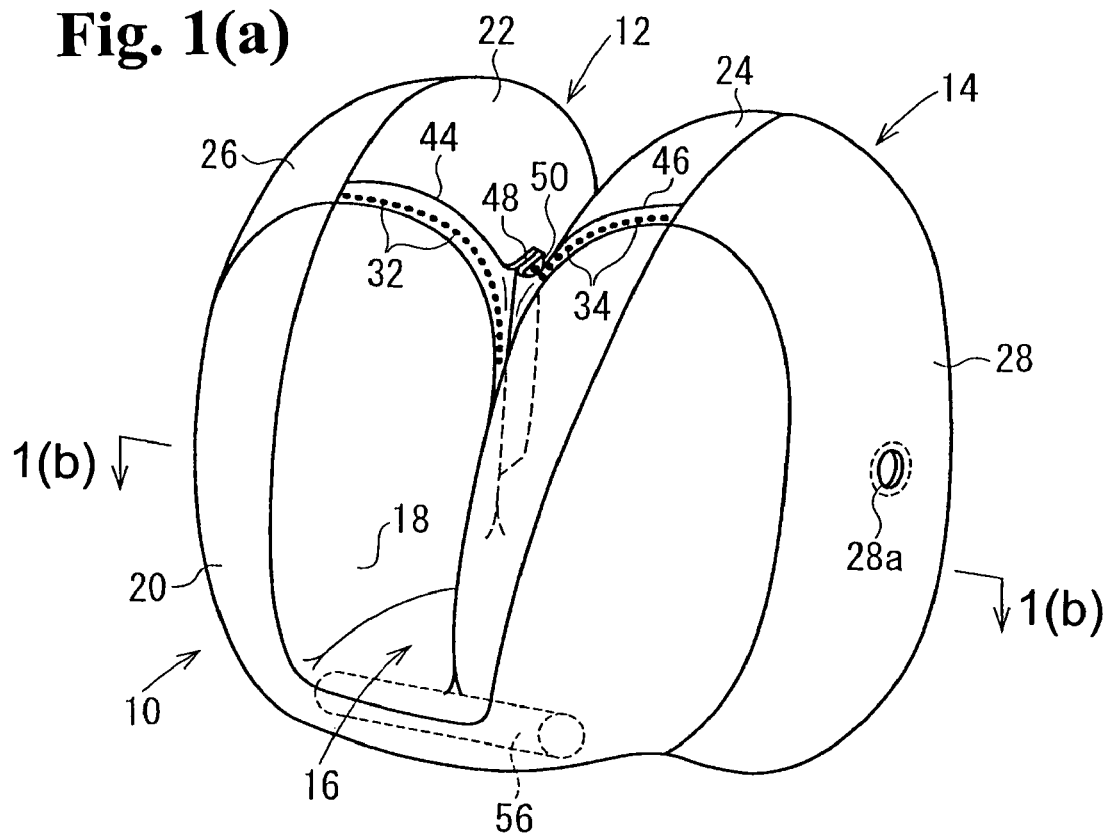
Figure 1B:
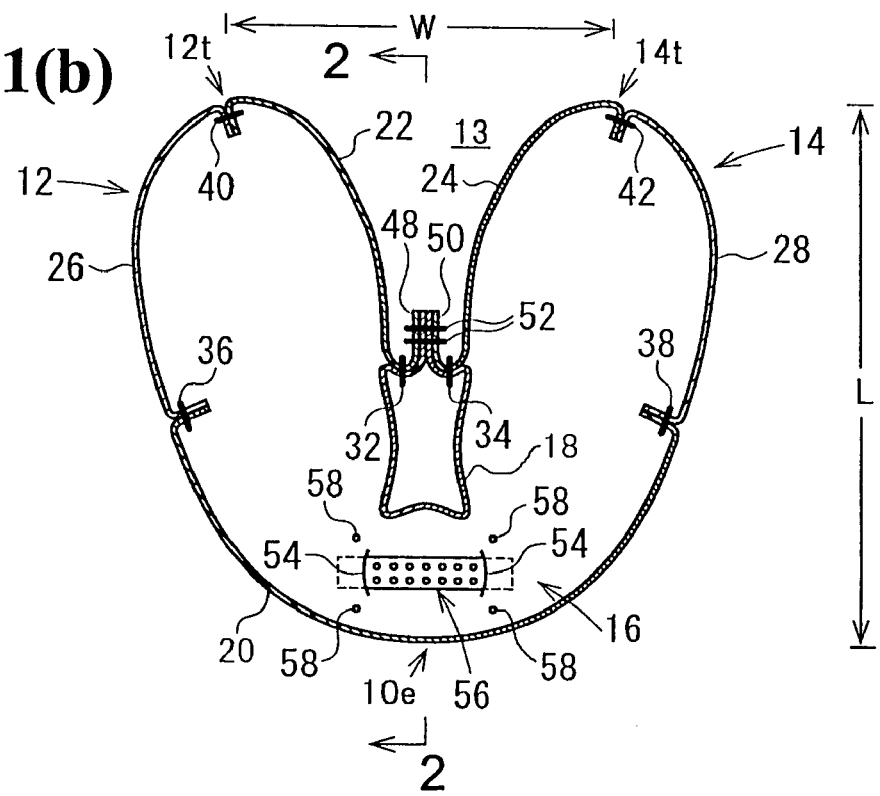
Figure 2:
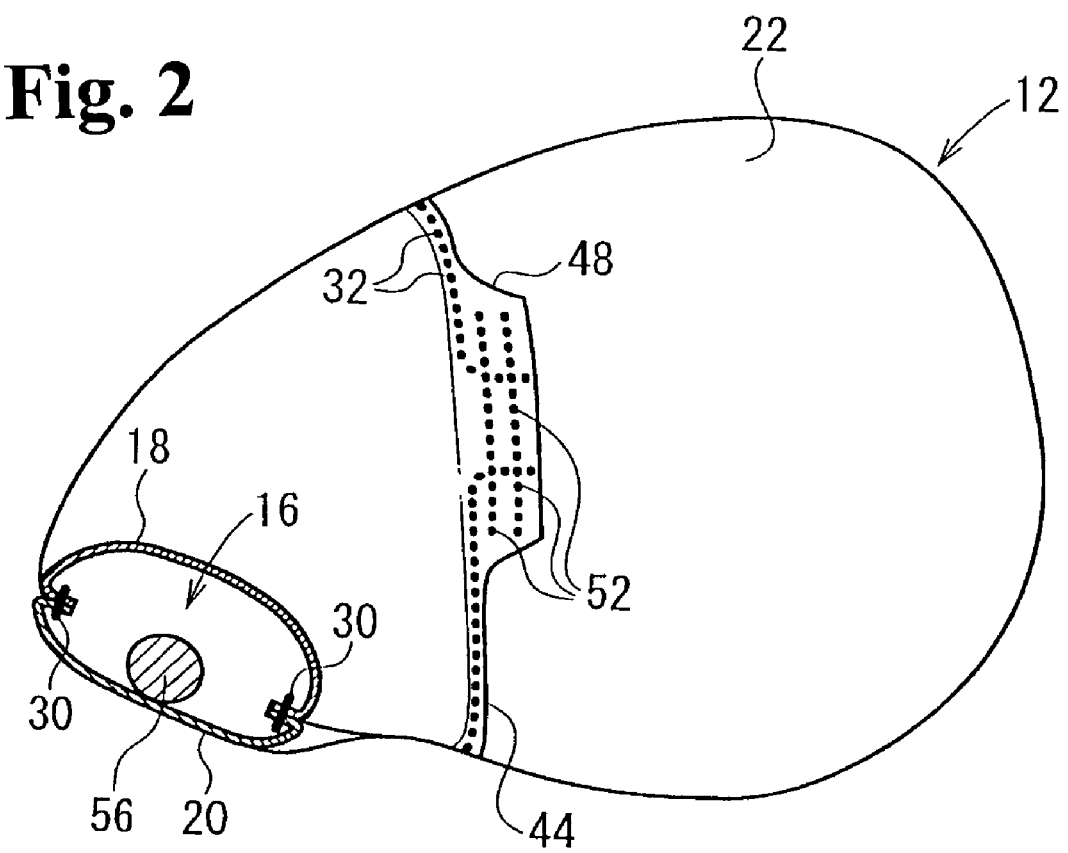
FIG. 2 is a sectional view taken along line 2—2 in FIG. 1(b)
Figure 3A:
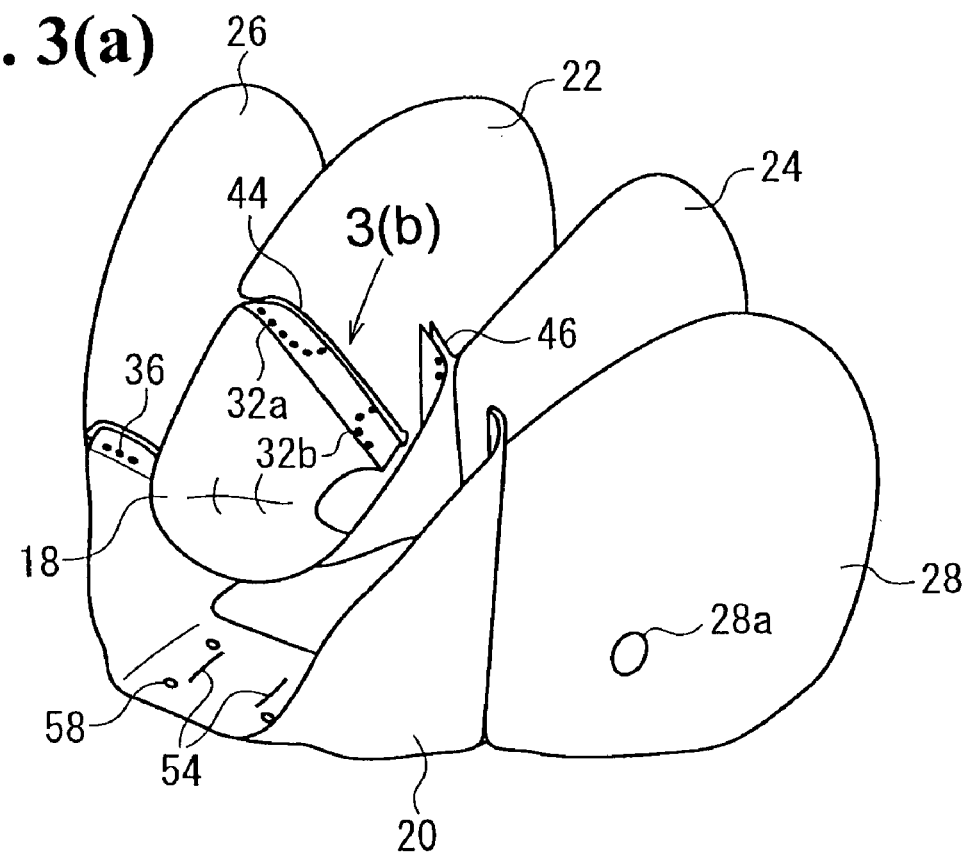
FIG. 3(a) is an exploded perspective view of the airbag shown in FIG. 1(a)
Figure 3B:
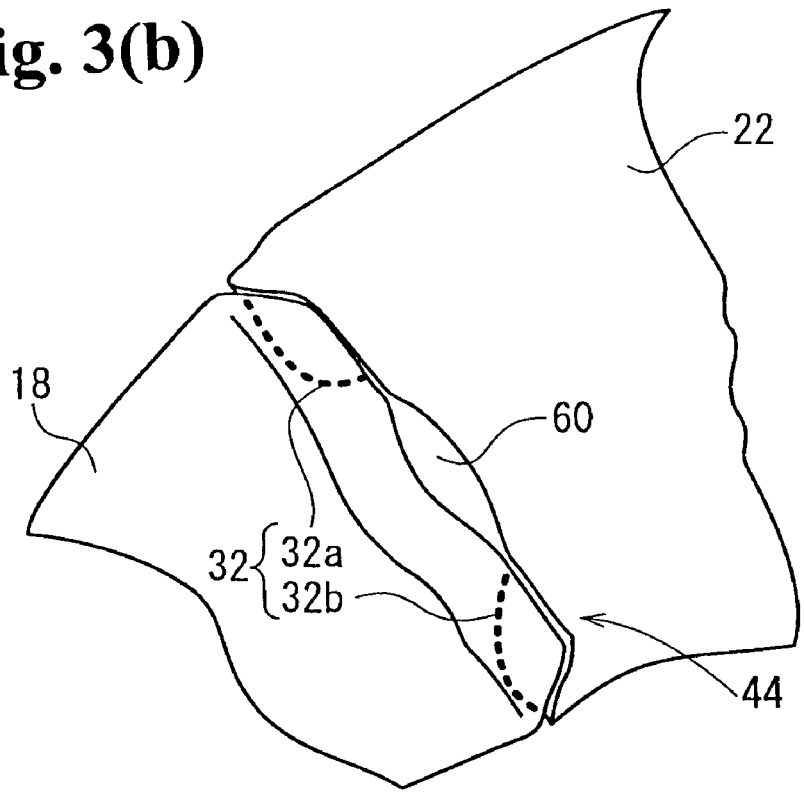
FIG. 3(b) is an enlarged view of a part 3(b) of the airbag shown in FIG. 1(a)

Hereunder, embodiments of the present invention will be described with reference to the accompanying drawings. FIG. 1(a) is a perspective view of an inflated airbag according to an embodiment of the present invention, and FIG. 1(b) is a sectional view taken along line 1(b)—1(b) in FIG. 1(a). FIG. 2 is a sectional view taken along line 2—2 in FIG. 1(b). FIG. 3(a) is an exploded perspective view of the airbag, and FIG. 3(b) is an enlarged view of a portion 3(b) in FIG. 3(a).

An airbag 10 includes a right half airbag 12 to be inflated at a front right of a vehicle occupant, a left half airbag 14 to be inflated at a front left of the occupant, and a communicating portion 16 for communicating an end of the right half airbag 12 with an end of the left half airbag 14. The communicating portion 16 is located at a side of a base of the airbag 10. Accordingly, the right half airbag 12 and the left half airbag 14 are inflated toward a direction that the half airbags move away from the communicating portion 16.

In the inflated state of the airbag 10, a bridge component such as a tie panel is not disposed between the distal ends of the right half airbag 12 and the left half airbag 14. A space 13 between the distal ends of the right half airbag 12 and the left half airbag 14 is open toward the occupant (i.e. upward in FIG. 1(b)). A distance W between a distal end 12t of the right half airbag 12 and a distal end 14t of the left half airbag 14 preferably ranges from 150 to 350 mm, and more preferably ranges from 170 to 330 mm. In the airbag 10, the right half airbag 12 is connected with the left half airbag 14 with seams 52 at midsections thereof in a direction that the airbag is inflated.

According to the embodiment, the airbag 10 is composed of panels 18, 20, 22, 24, 26, and 28, and the panels are stitched together. A configuration of the panels will be described next in detail. As shown in FIG. 3(a), the panel 18 (rear inner panel) constitutes rear inner surfaces of the right half airbag 12 and left half airbag 14 from the midsections in the direction of inflation, and an inner central surface of the communicating portion 16. The panel 20 (rear outer panel) constitutes a surface (outer surface of the airbag) opposite to the rear inner panel 18.

The panels 22 and 24 (front inner panels) constitute front inner surfaces of the right half airbag 12 and the left half airbag 14 from the midsections in the direction of inflation (opposing surfaces of the right half airbag 12 and the left half airbag 14). The panels 26 and 28 (front outer panels) constitute front outer surfaces (outer faces of the airbag) opposite to the front inner panels 22 and 24.

The rear inner panel 18 and the rear outer panel 20 are stitched with seams 30 (stitching threads). The rear inner panel 18 and the front inner panel 22 are stitched with a seam 32. The rear inner panel 18 and the front inner panel 24 are stitched with a seam 34. The rear outer panel 20 and the front outer panel 26 are stitched with a seam 36. The rear outer panel 20 and the front outer panel 28 are stitched with a seam 38.

A vent hole 28a for the left half airbag is disposed in the front outer panel 28. Although not shown in the drawings, a similar vent hole for the right half airbag is disposed in the front outer panel 26.

As shown in FIG. 1(a), seam allowances (joint portions) 44 and 46 connect the rear inner panel 18 and the front inner panel 22, and the rear inner panel 18 and the front inner panel 24, respectively, and are exposed at an outside of the right half airbag 12 and the left half airbag 14. As shown FIGS. 1(a) and 2, tongue-shaped seam allowances 48 and 50 protrude from the seam allowances 44 and 46 (FIG. 2 shows only the seam allowance 48). As shown in FIGS. 1(a) and 1(b), in particular in FIG. 1(b), the seam allowances 48 and 50 are stitched with seams 52.

As described above, the opposing surfaces of the right half airbag 12 and the left half airbag 14 are connected at the midsections thereof in the direction of inflation at the seam allowances 44, 46 of the rear inner panel 18 and the front inner panels 22, 24. A distance between a rear end 10e of the inflated airbag and the seams 52 preferably ranges from 30% to 70% of a longitudinal length L of the inflated airbag 10, and more preferably ranges from 40% to 55% of the length L.

A pair of slits 54 for inserting an inflator is formed in the rear outer panel 20 constituting the outer surface of the communicating portion 16. As shown FIGS. 1(a) and 1(b), a rod inflator 56 is used in the present embodiment. The rod inflator 56 is inserted into the slits 54 such that the inflator 56 extends through the communicating portion 16 in the width direction of the vehicle. Both ends of the inflator 56 are disposed outside of the airbag 10.

The airbag 10 is installed in an airbag device for protecting a vehicle occupant in the event of vehicle collision. The airbag device includes, for example, a box case with no lid (not shown) for accommodating the airbag 10, and the airbag 10 is connected with the case. As shown in FIG. 1(b), holes 58 are formed in the airbag 10 for inserting a fastener (not shown) such as a bolt to fix the airbag 10 to the case. Both ends of the inflator 56 are also attached to the case.

The airbag 10 is folded in the case and a cover such as a lid (not shown) is mounted on the case to cover the folded airbag 10, thus composing the airbag device. The lid is adapted to be torn by a pressing force exerted by the airbag 10 when the airbag is inflated.

The airbag device is installed in, for example, an instrument panel disposed in front of a passenger seat of a vehicle. In the event of vehicle collision, the inflator 56 ejects gas to the communicating portion 16. The gas from the inflator 56 flows in the right half airbag 12 and the left half airbag 14, thereby inflating the right half airbag 12 toward the front right of the occupant and the left half airbag 14 toward the front left of the occupant.

According to the airbag 10, the right half airbag 12 and the left half airbag 14 are inflated from the folded state. Furthermore, the right half airbag 12 and the left half airbag 14 are connected. When one of the half airbags 12 and 14 is inflated faster and the other of the half airbags 14 and 12 is inflated slower, the one half airbag facilitates the other half airbag to be inflated by pulling the other half airbag. As described above, the right half airbag 12 is connected to the left half airbag 14 with the seams 52 at the midsections thereof in the direction of inflation. Therefore, the one half airbag starts to pull the other half airbag from an early stage of inflation. Accordingly, both of the right half airbag 12 and the left half airbag 14 are inflated smoothly and substantially uniformly toward the left and right sides from the early stage of inflation.

In the completely inflated state of the airbag 10, a space 13 is formed between the distal ends of the right half airbag 12 and the left half airbag 14, and the space 13 is open toward the occupant. The inflated right half airbag 12 receives the right side of the occupant's thorax, the left half airbag 14 receives the left side of the occupant's thorax, and a portion around the occupant's breastbone faces the space 13. Therefore, when the occupant plunges into the airbag, a force applied to the portion around the breastbone is decreased.

A process of manufacturing the airbag 10 will be explained next. As shown in FIG. 3(a), the rear inner panel 18 and the front inner panel 22 are stitched with the seam 32, and the rear inner panel 18 and the front inner panel 24 are stitched with the seam 34 (FIG. 3(a) does not show the seam 34). The rear outer panel 20 and the front outer panel 26 are stitched with the seam 36, and the rear outer panel 20 and the front outer panel 28 are stitched with the seam 38 (FIG. 3(a) doe not show the seam 38). The seam allowances 44 and 46 connecting the rear inner panel 18 and the front inner panels 22 and 24 are disposed at the outside of the airbag in the finished state as the airbag device.

In the present embodiment, the seam allowance 44 connects the rear inner panel 18 and the front inner panel 22. As shown in FIG. 3(b), the rear inner panel 18 and the front inner panel 22 are stitched with the seam 32 (32a and 32b) only at both ends of the seam allowance 44. An opening 60 for reversing the airbag is formed between the seam 32a and the seam 32b.

The rear inner panel 18 stitched with the front inner panels 22 and 24, and the rear outer panel 20 stitched with the front outer panels 26 and 28 are overlapped such that outer surfaces of the airbag product face each other. The two stitched components are stitched with the seams 30, 40, and 42 at the peripheries thereof so that an intermediate airbag product is obtained in a reversed state.

The intermediate airbag product is reversed through the opening 60 formed in the seam allowance 44. The joint allowances 48 and 50 of the seam allowances 44 and 46 are stitched with the seams 52, thereby completing the airbag 10 product. When the joint allowances 48 and 50 are stitched, the seams 52 close the opening 60.

As described above, the airbag 10 is composed of a plurality of the panels. Accordingly, it is possible to form the outer surface of the airbag 10 having a large area and a complicated shape by the relatively small panels.

In the present embodiment, the seam allowances 44 and 46 connecting the rear inner panel 18 and the front inner panels 22 and 24 are joined, so that the right half airbag 12 is connected to the left half airbag 14. Therefore, it is not necessary to provide a tie panel for connecting the right half airbag 12 and the left half airbag 14 in addition to the panels 18, 22 and 24, thereby reducing a cost of the airbag.

In the present embodiment, a pair of slits 54 used as openings for the inflator is disposed in the rear outer panel 20 constituting the communicating portion 16. The rod inflator 56 is inserted into the slits 54, and disposed in the communicating portion 16. The slit openings for the inflator provide superior connection strength of the inflator 56 to the airbag 10.

In the manufacturing process of the airbag of the present embodiment, the opening 60 is provided in the seam allowance 44 for reversing the airbag product. Accordingly, in a case that it is difficult to reverse the intermediate airbag product through the vent hole or the opening of the inflator, in particular, in a case that the opening of the inflator is composed of the slits as described above, it is easy to reverse the intermediate airbag product through the opening 60.

Incidentally, the seams 52 close the opening 60 when the joint allowance 48 is stitched with the joint allowance 50. Therefore, the gas does not leak from the right half airbag 12 and the left half airbag 14 through the opening 60.

The embodiment described above is an example of the present invention, and the present invention is not limited to the embodiments illustrated in the drawings. For example, in the embodiment, the right half airbag 12 and the left half airbag 14 are connected at the base side. Alternatively, the half airbags may be separated. More than two inflators may be provided for inflating the right half airbag and the right half airbag separately. The midsections of the left half airbag and the right half airbag may be connected by a panel, a string, a net and the like. The left half airbag and the right half airbag may have a symmetric or asymmetric shape. The left half airbag and the right half airbag may have the same capacity or different capacities.

Figure 4:
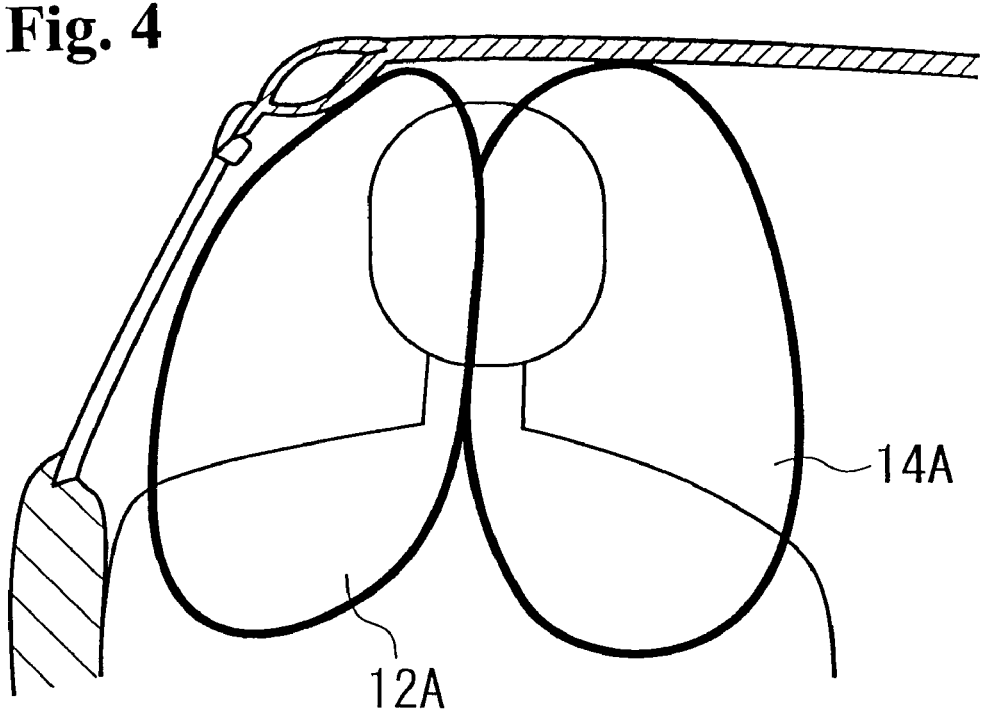
FIG. 4 is a view showing an airbag according to another embodiment of the present invention.

In the present invention, as shown in FIG. 4, a section of the airbag disposed at an A pillar side, i.e. a left half airbag 12A in FIG. 4, may be arranged such that an upper part of the half airbag 12A is inclined in a vehicle cabin, so that the half airbag does not contact the A pillar, a windshield, and a side window.

Figure 5:
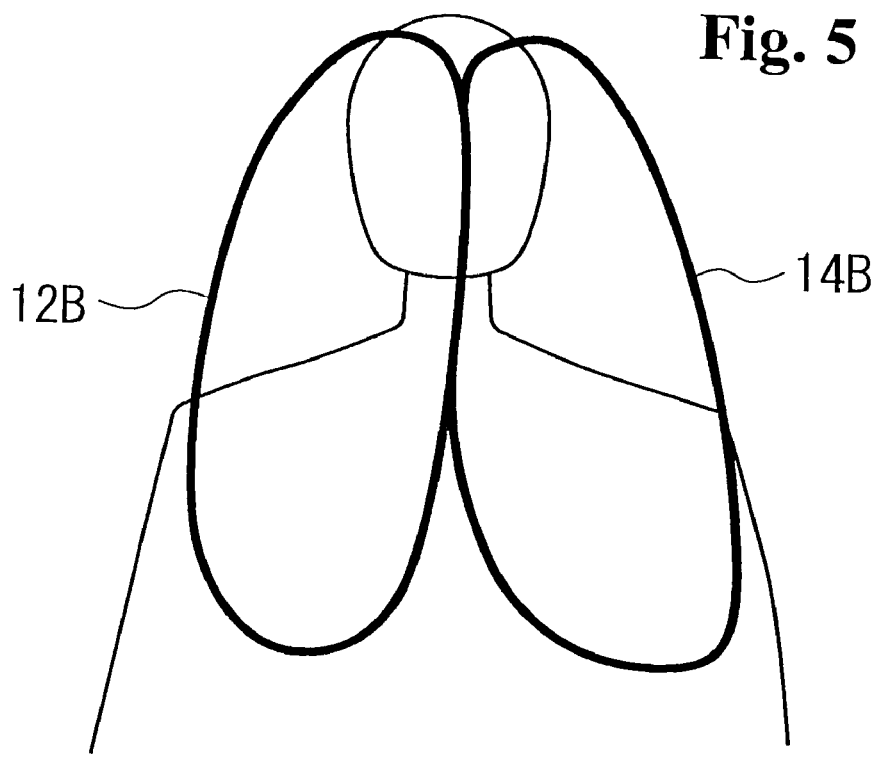
FIG. 5 is a view showing an airbag according to a further embodiment of the present invention.

As shown in FIG. 5, the half airbags may have shapes such that the widths gradually decrease toward the upper parts.

As described above, according to the present invention, the airbag and the airbag device include the left half airbag for receiving the left side of the occupant's thorax, the right half airbag for receiving the right side of the occupant's thorax, and the space disposed between the two half airbags to face the portion around a breastbone of the occupant. In the airbag and the airbag device, both of the left half airbag and the right half airbag are inflated smoothly and substantially uniformly toward the left and right sides from the early stage of inflation.

While the invention has been explained with the specific embodiments of the invention, the explanation is illustrative and the invention is limited only by the appended claims.

What is claimed is:

1. An airbag for protecting an occupant, comprising:
    a left half airbag to be inflated at a front left of the occupant and having a distal end; and
    a right half airbag to be inflated at a front right of the occupant and having a distal end, said distal ends of the left and right half airbags being separated from each other to form a space therebetween facing the occupant when the airbag is inflated, said left half airbag being connected with the right half airbag at a midsection between the left and right half airbags forming a first space between the left half airbag and the midsection and a second space between the right half airbag and the midsection.

2. An airbag according to claim 1, wherein said distal ends of the left and right half airbags are spaced by a distance between 150 and 350 mm when the airbag is inflated.

3. An airbag according to claim 1, further comprising a base for communicating the left and right half airbags, said left and right half airbags being inflatable by a common inflator.

4. An airbag according to claim 1, wherein each of said left half airbag and said right half airbag is formed of a plurality of panels having joint allowances disposed at the midsection, said left half airbag being connected with the right half airbag at the joint allowances.

5. An airbag according to claim 1, wherein at least one of said left half airbag and said right half airbag has an inclined upper portion when the airbag is inflated.

6. An airbag according to claim 1, wherein at least one of said left half airbag and said right half airbag has a width gradually decreasing upwardly when the airbag is inflated.

7. An airbag device comprising the airbag according to claim 1 and an inflator for inflating the airbag.

8. An airbag according to claim 1, further comprising a base connected to the left and right half airbags, said left and right half airbags communicating only through the base.

* * * * *